Dec. 8, 1931.  J. BARDWELL ET AL  1,834,994
COTTON PICKING MECHANISM
Filed March 28, 1930
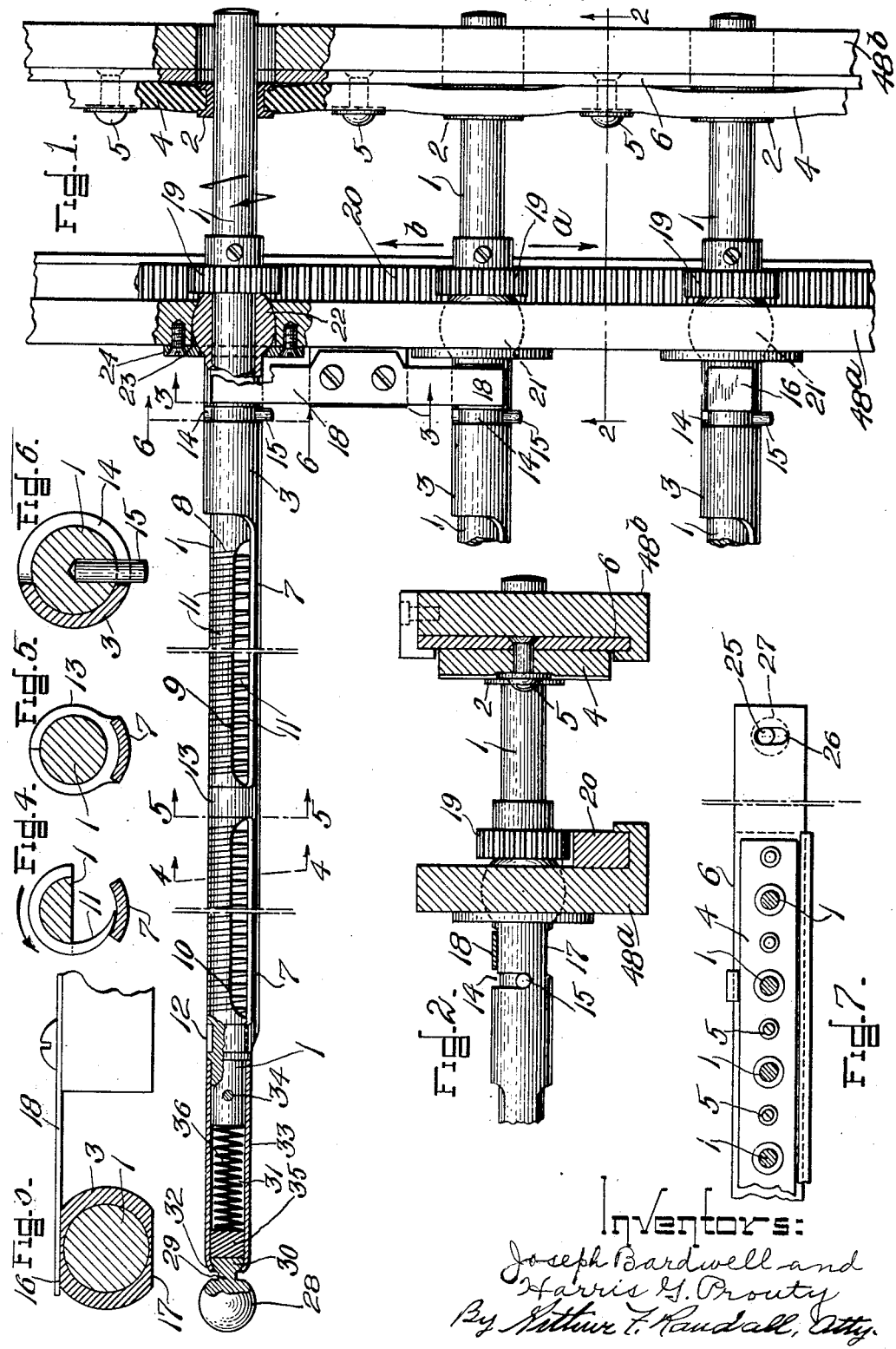
Inventors:
Joseph Bardwell and
Harris G. Prouty
By Arthur E. Randall, Atty.

Patented Dec. 8, 1931

1,834,994

UNITED STATES PATENT OFFICE

JOSEPH BARDWELL AND HARRIS G. PROUTY, OF WHITMAN, MASSACHUSETTS

COTTON PICKING MECHANISM

Application filed March 28, 1930. Serial No. 439,647.

Our invention relates to cotton picking mechanisms and particularly to picker mechanisms for incorporation in cotton harvesting machines and the object of our invention is to provide improved picker mechanism of this class. More especially, our invention has for its object to provide improved picker mechanism for incorporation in a cotton harvesting machine such as is illustrated and described in our co-pending application Serial No. 399,848 filed October 15, 1929.

To these ends we have provided a picker mechanism for harvesting cotton, said mechanism having the peculiar features of construction and mode of operation set forth in the following description, the several novel features of our invention being particularly pointed out and defined separately in the claims at the close thereof.

In the accompanying drawings:

Figure 1 is a plan view, partly broken away and in section, of a picker mechanism constructed in accordance with our invention.

Figure 2 is a section on line 2—2 of Figure 1.

Figure 3 is a section on line 3—3 of Figure 1.

Figure 4 is a section on line 4—4 of Figure 1.

Figure 5 is a section on line 5—5 of Figure 1.

Figure 6 is a section on line 6—6 of Figure 1.

Figure 7 is a detail hereinafter described.

The cotton harvesting machine of our application above referred to is a vehicle adapted to travel over the ground along a row of cotton plants, and as it traverses said row a multiplicity of picker elements carried thereby are moved into and out of the plants so as to remove the cotton bolls therefrom. These picker elements are mounted upon a carriage that is movable on the frame of the vehicle toward and from the plants of the row.

The picker elements are barbed stems and when their carrier frame is moved toward the row of plants said stems are projected into the latter and then rotated in one direction to cause the barbs of the stems to engage the bolls of cotton after which the carrier frame is moved away from the row of plants withdrawing the picker stems from the latter. When the carrier frame reaches the limit of its movement away from the plants the stems are rotated in the opposite direction to free the picked cotton from the barbs thereof.

In the accompanying drawings 48a and 48b illustrate two cross-bars which may constitute part of the movable picker carrier frame referred to above, said bars corresponding with one of the pairs of bars (48) of the machine illustrated and described in our said co-pending application.

Each picker element of our improved picker mechanism comprises a spindle 1 which is rotatably supported adjacent its rear end by a metal bushing 2 and a short sleeve 3.

The metal bushing 2 is fixed within an aperture provided through a strip of stiffly elastic rubber 4 fastened by rivets 5 to a relatively thin supplemental bar or rail 6 slidably supported in position against the inner side of the cross-bar 48b.

The sleeve 3 constitutes the rear end portion of a doffer-sheath 7 which as shown in Figs. 4 and 5 is arcuate in cross section and disposed parallel with, and close to, the spindle 1.

The spindle 1 is made from a length of round bar stock in which is formed a spiral groove 8 extending through a portion of the length of the spindle that is opposite the doffer-sheath bar 7. Then the spindle 1 is cut away or recessed as at 9 and 10 so that only semi-circular portions of originally spiral groove 8 remain in the spindle 1. Then a barb 11 is fixed within each semi-convolution of the groove 8 as illustrated clearly in Figs. 1 and 4.

At its forward end the doffer-sheath bar 7 is made with a split ring 12 that is rotatably mounted within an annular groove provided upon the forward end portion of the spindle 1. Also about midway of the length of the doffer-sheath bar 7 a similar split ring 13 is provided that is rotatably mounted within another annular groove provided in spindle 1.

The sleeve portion 3 of the doffer-sheath is formed with a circumferential slot 14 which is approximately one hundred and eighty degrees in length and occupied by a stud or pin 15 projecting radially from the spindle 1 as shown in Figs. 1 and 6. Thus it is possible for the sleeve and spindle to rotate relatively to the extent of one half of a revolution or one hundred and eighty degrees.

Alongside of the slot 14 the sleeve portion 3 of the doffer-sheath is made with two flat peripheral surfaces 16 and 17, Figs. 1 and 3, to co-operate with a leaf spring 18 fastened by screws to the cross-bar 48a. Normally the spring 18 is in engagement with the flat surface 16 and holds the doffer-sheath bar 7 opposite the free pointed ends of the barbs 11 as shown in Fig. 4.

When the picker stem is to be moved endwise forward into the plants the parts thereof occupy the positions shown in the drawings and they retain these positions until each picker stem reaches the limit of its forward movement. In the illustrated embodiment of our invention these stems are moved endwise toward the left to project the same into the plants of the row.

When the picker stems reach the limit of their movement toward or into the plants, each spindle 1 is rotated in the direction of the arrow, Fig. 1, to the extent of one revolution. During the first half of this revolution of each spindle 1 its sleeve 3 and doffer-sheath bar 7 are held against turning with the spindle by the spring 18 so that at the completion of the first half of the revolution of spindle 1 the doffer-sheath bar 7 is at one side of the spindle and the pointed ends of the barbs 11 are unsheathed and at the opposite side of the spindle. It will therefore be clear that during the last half of the revolution of the spindle 1 the barbs 11 will engage the cotton of the bolls and wrap the same more or less about the picker stem.

The parts of each picker stem remain in their cotton-engaging positions until each picker stem has been moved back endwise to the limit of its movement away from the cotton plants, whereupon each spindle 1 is rotated in the opposite direction to the extent of one complete revolution.

At the start of this reverse motion of the spindle 1 the spring 18 is in engagement with the flat surface 17 and therefore sleeve 3 and bar 7 are held stationary by said spring 18 during the first half of the backward revolution of spindle 1 so that as the barbs 11 pass into position under the doffer-sheath bar 7 the cotton is pushed off from the barbs by said bar after which the spindle 1 completes the last half of its backward revolution which restores the parts to their original positions with spring 18 in engagement with the flat surface 16 on sleeve 3.

As in the machine of our application referred to above, each spindle 1 has fast thereon a pinion 19 that is in mesh with a rack 20 that is slidably mounted upon the inner side of the cross-bar 48a and this rack is associated in said machine with means which automatically moves the same endwise in the direction of the arrow a, Fig. 1, a distance sufficient to impart one revolution in the direction of the arrow to each spindle 1 when the latter reaches the limit of its movement toward and into the plants and which also automatically moves the rack 20 in the direction of the arrow b, Fig. 1, a distance sufficient to rotate each spindle in a reverse direction to the extent of one revolution when said spindle reaches the limit of its movement away from the plants.

One of the features of the present invention consists in connecting the rear end of each sleeve 3 with the bar 48a by a ball and socket joint 21 so that said sleeve can swing universally on said joint 21 and also rotate. Also each pinion 19 is associated with the rack 20 so as to permit of substantial universal swinging movement of the sleeve 3 on the ball and socket joint 21.

Normally the rubber strip 4 with its bushing 2 holds each spindle 1 with its axis perpendicular with relation to the cross-bars 48a and 48b.

It will therefore be clear that if the forward end of a picker stem strikes against a sturdy bough of the plant it may be deflected thereby sidewise in any direction, said bough operating to swing the free end of the picker stem laterally on the ball and socket joint 21 so that said stem will pass at one side of the bough thus avoiding injury to the picker stem. When the forward end of the picker stem is thus deflected laterally in one direction or another, the rubber strip 4 which supports the rear end of the spindle will yield to permit the movement of the spindle on the ball and socket joint 21. When the picker stem is withdrawn from the plants the rubber strip 4 will resume its normal condition and restore the picker stem to perpendicular relationship with the cross-bars 48a and 48b. As shown in the upper part of Fig. 1 the ball and socket joint 21 comprises a ball 22 that is formed upon the rear end of the sleeve 3, said ball being held within a socket 23 provided in cross-bar 48a by means of a ring retainer 24 fastened by screws to said cross-bar.

Another feature of the present invention consists in mounting the supplemental bar 6 on the cross-bar 48b so that it can move endwise thereon and in providing a wrist pin 25, Fig. 7, for reciprocating the supplemental bar 6 either continuously or intermittently at predetermined intervals.

As illustrated in Fig. 7 the wrist pin 25 may occupy a transverse slot 26 provided in the supplemental bar 6.

The wrist pin 25 is illustrated as provided at one end of a shaft 27 mounted upon any convenient part of the frame of the machine and this shaft may be actuated by any convenient and suitable devices except that it is an essential feature that the supplemental bar 6 is reciprocated as described during the time that the picker stems are moved endwise forward into the cotton plants. Thus as the picker stems are moved forward into the plants each is vibrated laterally on its ball and socket joint 21 which tends to prevent the forward end thereof from lodging against a bough of the plant.

Another feature of our present invention in its preferred form consists in providing the forward end of each picker stem with a head or terminal member 28 that is approximately spherical except that it is provided with a shank portion 29 that is pivotally connected with the forward end of the spindle 1 by a universal joint comprising an approximately hemispherical end portion 30 that is movably confined within the outer end of a chamber 31 by means of an inturned flange 32 provided at the forward end of a sleeve 33. This sleeve 33 constitutes the forward end portion of the spindle 1 and is fixed rigidly to the latter by means of a pin or rivet 34. Sleeve 33 provides the chamber 31 within which is slidably mounted a cylindrical follower 35 that is yieldingly but firmly forced against the inner flat side of the hemispherical portion 30 of shank 29 by means of a spring 36 arranged within the chamber 31.

It will thus be clear that the spring 36 acts through the follower 35 to yieldingly hold the hemispherical end portion 30 of shank 29 against the inturned flange 32 so that normally the axis of the end member 28 is maintained coincident and parallel with the axis of the spindle 1.

The end member 28 is provided to serve as a piloting deflector by means of which the forward end of the spindle 1 is directed laterally in one direction or another around or past a bough or branch of the plant against which it may strike.

Picker stems of the type above described are necessarily made as light and as slim as possible for the reason that a large number thereof are mounted on the picker carrier referred to above, and because of the fact that this carrier is moved back and forth on the main frame of the machine to shift the picker stems into and out of the plants, it is desirable that the weight and inertia of said carrier, and of the stems carried by it, be as little as possible. Therefore, as heretofore constructed, it has frequently happened that stems of this kind would be broken and bent through engagement with heavy boughs or stems of the cotton plants.

The above described construction, however, obviates this disadvantage that characterized stems of this type as heretofore constructed and enables the spindles of the latter to be made of minimum size since the above described stem construction and mode of operation prevents each stem from lodging endwise against a rigid stem or bough as it is moved forward into the plants.

In machines of the class shown and described in our co-pending application the picker stems are arranged on their carrier in a bank made up of horizontal and vertical rows of picker stems, said bank comprising five or six hundred stems. The stems near the top of this bank may, if desired, be made as heretofore for the reason that the upper branches of the plants are frail and pliable and offer no substantial resistance to the picker stem, but it is desirable to employ the above described construction in connection with the picker stems making up the lower portion of the bank since the boughs and stems near the base of the plants are heavy and sturdy enough to injure or destroy picker stems of the ordinary constructions heretofore proposed.

What we claim is:

1. A picker stem comprising a barbed spindle provided at its forward free end with a laterally movable piloting member.

2. A picker stem comprising a barbed spindle; a piloting terminal member connected with the forward free end of said spindle so as to move laterally with respect thereto, and means yieldingly holding said member in axial alinement with said spindle.

3. A picker stem comprising a barbed spindle; a piloting terminal member pivotally connected at one end with the forward free end of said spindle so as to swing universally sidewise with respect to said spindle, and means yieldingly holding said member in axial alinement with said spindle.

4. A picker stem comprising a barbed spindle formed with a chamber adjacent its free end; a piloting terminal member made with an enlargement at its inner end that is pivotally confined within said chamber by an inturned flange on said spindle and made with a flat rear surface, and a spring within said chamber between the inner end wall thereof and said flat surface for yieldingly holding said terminal member in axial alinement with said spindle.

5. A picker stem comprising a barbed spindle formed with a chamber adjacent its forward free end; a piloting terminal member made with a parti-spherical enlargement at its inner rear end that is pivotally confined within said chamber by an inturned flange provided at the forward end of said spindle and made with a flat rear surface; a follower slidably mounted within said chamber behind said enlargement and made with a flat end surface to engage the flat rear surface of said enlargement, and a spring within said chamber which acts through said follower to yieldingly hold said terminal member in axial alinement with said spindle.

6. A picker stem comprising a barbed spindle formed with a chamber adjacent its forward free end; a substantially spherical piloting terminal member having a shank portion made at its rear end with a parti-spherical enlargement that is pivotally confined within said chamber by an inturned flange provided at the forward end of said spindle, said enlargement being made with a flat rear surface that is perpendicular with relation to the axis of said terminal member; a follower slidably mounted within said chamber behind said enlargement and made with a flat end surface engaging the flat rear surface of said enlargement, and a spring within said chamber that acts through said follower to yieldingly hold said substantially spherical terminal member in axial alinement with said spindle.

7. A picker stem comprising a barbed spindle including as a part of its forward free end a laterally movable piloting terminal member that is yieldingly held in axial alignment with the main body portion of said spindle; a universal joint by which said spindle is supported near its rear end at a predetermined distance away from said end, and means engaging the rear end portion of said spindle for yieldingly opposing movement of the same laterally on said universal joint in any direction.

Signed by us at Boston, Suffolk County, Massachusetts, this 26th day of March, 1930.

JOSEPH BARDWELL.
HARRIS G. PROUTY.